United States Patent
Shimahara et al.

(10) Patent No.: US 10,823,216 B2
(45) Date of Patent: Nov. 3, 2020

(54) EXPANSION ANCHOR WITH CLIPPED-OPEN EXPANSION PART

(71) Applicant: Hilti Aktiengesellschaft, Schaan (LI)

(72) Inventors: Hideki Shimahara, Buchs (CH); Christian Wachter, Buers (AT)

(73) Assignee: Hilti Aktiengesellschaft, Schaan (LI)

(*) Notice: Subject to any disclaimer, the term of this patent is extended or adjusted under 35 U.S.C. 154(b) by 287 days.

(21) Appl. No.: 16/072,827

(22) PCT Filed: Jan. 24, 2017

(86) PCT No.: PCT/EP2017/051358
§ 371 (c)(1),
(2) Date: Jul. 25, 2018

(87) PCT Pub. No.: WO2017/129534
PCT Pub. Date: Aug. 3, 2017

(65) Prior Publication Data
US 2019/0032692 A1 Jan. 31, 2019

(30) Foreign Application Priority Data

Jan. 26, 2016 (EP) .................................... 16152678

(51) Int. Cl.
*F16B 13/06* (2006.01)
(52) U.S. Cl.
CPC ............ *F16B 13/065* (2013.01); *F16B 13/06* (2013.01)
(58) Field of Classification Search
CPC ...... F16B 13/004; F16B 13/06; F16B 13/065; F16B 13/066; F16B 13/0858; F16B 13/122; F16B 13/124; F16B 13/128; F16B 13/144
(Continued)

(56) References Cited

U.S. PATENT DOCUMENTS

| 1,793,739 A | * | 2/1931 | Johnston | ............... F16B 13/066 |
| | | | | 411/51 |
| 2,120,577 A | * | 6/1938 | Schulte | ............... F16B 13/0858 |
| | | | | 411/71 |

(Continued)

FOREIGN PATENT DOCUMENTS

| CH | 254174 A | 4/1948 |
| CN | 2379636 Y | 5/2000 |

(Continued)

OTHER PUBLICATIONS

PCT/EP2017/051358, International Search Report (PCT/ISA/220 and PCT/ISA/210) dated Mar. 14, 2017, with partial English translation, enclosing Written Opinion of the International Searching Authority (PCT/ISA/237) (Twelve (12) pages).

*Primary Examiner* — Roberta S Delisle
(74) *Attorney, Agent, or Firm* — Crowell & Moring LLP

(57) ABSTRACT

An expansion anchor includes a bolt as a first element and an expansion part as a second element. One of the two elements has a first rib running longitudinally along the bolt and the other of the two elements has a first groove running longitudinally along the bolt, where the first rib engages in the first groove. The one of the two elements has a second rib running longitudinally along the bolt and the other of the two elements has a second groove running longitudinally along the bolt, where the second rib engages in the second groove. A first catch of a snap connection is formed between the first rib and the first groove and a second catch of the snap connection is formed between the second rib and the second groove, where the first catch and the second catch hold the expansion part radially to the bolt.

7 Claims, 3 Drawing Sheets

(58) Field of Classification Search
USPC .................. 411/44–46, 51, 60.1, 60.2, 63, 73
See application file for complete search history.

(56) References Cited

U.S. PATENT DOCUMENTS

| | | | |
|---|---|---|---|
| 2,955,504 A * | 10/1960 | Lovrinch | F16B 13/066 |
| | | | 411/51 |
| 3,546,998 A | 12/1970 | Lerich | |
| 3,766,819 A | 10/1973 | Giannuzzi | |
| 3,799,027 A | 3/1974 | Galloway | |
| 3,802,311 A | 4/1974 | Ziegler | |
| 3,922,947 A | 12/1975 | Leonardo et al. | |
| 4,334,813 A | 6/1982 | Oettl | |
| 4,482,277 A | 11/1984 | Schiefer | |
| 4,607,992 A | 8/1986 | Mauritz et al. | |
| 4,609,316 A | 9/1986 | Oettl | |
| 4,883,395 A * | 11/1989 | Klaric | F16B 35/041 |
| | | | 411/55 |
| 5,156,507 A * | 10/1992 | Underbrink | F16B 13/066 |
| | | | 411/63 |
| 5,352,066 A * | 10/1994 | Schaeffer | E21D 20/025 |
| | | | 405/259.4 |
| 5,702,216 A * | 12/1997 | Wu | F16B 13/066 |
| | | | 411/32 |
| 6,524,046 B2 * | 2/2003 | Hsu | F16B 13/065 |
| | | | 411/51 |
| 6,712,572 B2 * | 3/2004 | Bisping | F16B 13/0825 |
| | | | 411/60.1 |
| 8,974,162 B2 * | 3/2015 | Shimahara | B21H 3/022 |
| | | | 411/51 |
| 9,765,804 B2 | 9/2017 | Schaeffer | |
| 2003/0017023 A1 | 1/2003 | Bisping et al. | |
| 2003/0017024 A1 * | 1/2003 | Bisping | F16B 13/0825 |
| | | | 411/60.1 |
| 2009/0252571 A1 | 10/2009 | Zimmerer et al. | |
| 2014/0072384 A1 * | 3/2014 | Wissling | E04B 1/40 |
| | | | 411/44 |
| 2016/0238052 A1 | 8/2016 | Schaeffer | |
| 2017/0343026 A1 | 11/2017 | Schaeffer | |

FOREIGN PATENT DOCUMENTS

| | | |
|---|---|---|
| CN | 202251296 U | 5/2012 |
| DE | 36 01 598 A1 | 7/1987 |
| DE | 196 08 922 A1 | 9/1997 |
| DE | 10 2011 051 618 A1 | 1/2013 |
| EP | 0 107 472 B1 | 5/1984 |
| EP | 1 150 024 B1 | 5/1984 |
| EP | 2 848 825 A1 | 3/2015 |
| EP | 2 848 826 A1 | 3/2015 |
| EP | 2 871 374 A1 | 5/2015 |
| FR | 2 352 979 A1 | 12/1977 |
| GB | 1 309 391 A | 3/1973 |
| TW | I579467 B | 4/2017 |

* cited by examiner

EXPANSION ANCHOR WITH CLIPPED-OPEN EXPANSION PART

CROSS REFERENCE TO RELATED APPLICATIONS

This application claims the priority of International Application No. PCT/EP2017/051358, filed Jan. 24, 2017, and European Patent Document No. 16152678.5, filed Jan. 26, 2016, the disclosures of which are expressly incorporated by reference herein.

BACKGROUND AND SUMMARY OF THE INVENTION

The invention relates to an expansion anchor. Such an expansion anchor is equipped with a bolt as a first element and at least one expansion part, arranged on the bolt, as a second element, wherein there are arranged on the bolt an expansion region for radially displacing the expansion part relative to the bolt as well as a load-bearing device for transferring tensile forces into the bolt, wherein one of the two elements has a first rib running lengthwise along the bolt and the other one of the two elements has running lengthwise along the bolt a first groove, in which the first rib engages, and wherein one of the two elements has a second rib running lengthwise along the bolt and the other of the two elements has running lengthwise along the bolt a second groove, into which the second rib engages.

EP 2848825 A1 depicts a generic expansion anchor, in which the bolt has in the neck region a plurality of grooves, which extend lengthwise along the bolt, and in which the expansion sleeve has on its inner side a plurality of ribs, which engage in the grooves, and by means of which the wall thickness of the expansion sleeve is in each case locally increased. An expansion reserve can hereby be created, which allows for a particularly large expansion, without having to significantly weaken the bolt in the neck region.

Another expansion anchor, in which structures on the bolt and the expansion sleeve engage into each other, is known from EP 2848826 A1. EP 2871374 A1 describes an anchor, in whose expansion cone, there are provided furrows to minimize friction.

U.S. Pat. Nos. 4,482,277 A and 4,334,813 A disclose various expansion anchors, whose expansion sleeves each consist of two half-shells that are interlocked. Additional expansion anchors, whose expansion sleeves each consist of two half-shells, emerge from U.S. Pat. No. 4,609,316 A, DE 3601598 A1, U.S. Pat. No. 3,766,819 A, FR 2352979 A1 and EP 0107472 B1. U.S. Pat. No. 3,546,998 A discloses an anchor with two expanding half-shells, between which a hinge is formed, and between which a spring is acting.

US 2003017023 A and GB 1309391 A describe additional anchors with multi-part expansion bodies, which are connected to each other by means of various hinges.

U.S. Pat. No. 3,922,947 A pertains to an anchor with an expansion sleeve, which has a groove, wherein the groove forms a bend line.

U.S. Pat. No. 6,712,572 A describes an attachment element having a cylindrically-shaped expansion body having an interior-contoured borehole, the body being divided into at least two segments, wherein adjoining segments are connected by hinge elements, which form snap locks.

U.S. Pat. No. 4,607,992 A describes an expansion anchor with an expansion body, which is screwed on to the bolt. To prevent the expansion body from falling out of the borehole, expanding opposite the front end, in the expansion sleeve, the expansion sleeve is equipped on its front end with a projection to which there is formed a snap lock between the expansion body and the expansion sleeve.

CH 254174 A describes an expansion anchor, whose expansion body has lugs, which engage in slots in the expansion sleeve to guard against loss.

An anchor, which has an axially acting snap lock, which holds the expansion body between the spread-apart expansion limbs, is known from DE 19608922 A1.

EP 1150024 B1 describes an expansion anchor with two catch devices, which can secure a so-called setting sleeve in two different axial positions on the shaft. The setting sleeve is hereby used to exert an axial force on the expansion element to expand the expanding element.

U.S. Pat. Nos. 3,802,311 A and 3,799,027 A describe expansion anchors with wedge-like expansion parts, on which spring arms are attached. The expansion parts can be snapped open on the bolt by means of the spring arms in such a manner that the spring arms partly enclose the bolt.

DE 102011051618 A1 pertains to an expansion anchor with a connector, which connects the expansion body in a specified position to the expansion sleeve. A snap connection of the expansion body can thereby be provided with the connector, which holds the expansion body in the specified position.

US 2009252571 A describes a plastic dowel sleeve, which consists of two interlocked parts.

The object of the invention is to develop a generic expansion anchor in such a manner that it is particularly simple to manufacture, while being particularly high-performance and reliable.

An expansion anchor according to the invention is characterized in that the expansion part is attached to the bolt by means of a snap connection, wherein a first catch of the snap connection is formed between the first rib and the first groove, wherein a second catch of the snap connection is formed between the second rib and the second groove, and wherein the first catch and the second catch hold, in particular jointly, the expansion part radially to the bolt.

A basic concept of the invention can be seen in the attaching of the expansion part to the bolt by means of a snap connection, wherein the interlocking groove-rib structures, which as described in EP 2848825 A1 for example can also be used if applicable to increase the efficiency of the anchor, are components of the snap connection here and form catches, which secure the expansion part in a form-locking manner to the bolt. Between the first rib and the first groove there is formed in other words, particularly on the respective flanks, a first form-locking connection and between the second rib and the second groove, particularly on the respective flanks, a second form-locking connection, wherein the two form-locking connections jointly secure the expansion part radially to the bolt. A snap connection may commonly refer preferably to an arrangement for the form-locking joining of components, wherein in the process of joining, a joined part is elastically deformed and then interlocks with the second joined part. The interlocking is thereby formed according to the invention between the two grooves and the two ribs, wherein the part elastically deformed in the joining process is preferably the expansion part. The expansion part is thus snapped open on to the bolt. That the expansion part is attached to the bolt by means of a snap connection according to the invention can preferably be demonstrated by the fact that the form-locking attachment of the expansion part to the bolt can be released by an elastic bending, i.e., by a deformation below the yield limit, of at least one of the two elements, particularly by the purely elastic bending-open of the expansion part.

For example, the grooves and the ribs may run parallel to the longitudinal axis of the bolt. However, the grooves and the ribs may also encircle the longitudinal axis in a spiral-shaped manner, i.e., the grooves or the ribs may also have a directional component in the circumferential direction. Preferably, the expansion of the grooves and/or the ribs in the axial direction is greater than in the circumferential direction. When talking about "radial," "axial," and "circumferential direction", this may refer in particular to the longitudinal axis of the bolt, which may preferably be the symmetrical and/or center axis of the bolt.

The expansion region is preferably arranged in the region of the front end of the bolt and/or the load-bearing device in the region of the rear end of the bolt facing away from the front end. The expansion part is held in a radial direction to the bolt by means of the snap connection. However, preferably the snap connection allows a displacement of the expansion part lengthwise along the bolt to allow a relative motion of the bolt with the expansion region relative to the expansion part, and thus allow a particularly and structurally simple expansion mechanism. The expansion part and/or the bolt consist suitably of a metal material, which can also be coated. The load-bearing device can be designed particularly as an exterior thread, but also as an interior thread for example. It serves to transfer tensile forces, which are directed in the extraction direction, in the bolt.

According to the invention, there may be formed between the expansion region and the expansion part a wedge gear, which converts an axial relative motion between the expansion region and the expansion part into a radial relative motion between the expansion region and the expansion part. Preferably, the expansion part can thus be pushed radially outward by the expansion region and be pressed against the borehole wall in the substrate when the expansion region, particularly together with the bolt, is axially displaced in the extraction direction relative to an expansion part. In turn, the expansion anchor can hereby be anchored in the borehole. The expansion region can also be used to radially press the expansion part to a wall of the borehole.

Preferably, the extraction direction runs parallel to the longitudinal axis of the bolt and/or points out of the borehole. At the expansion region, the distance of the bolt surface may increase from the longitudinal axis of the bolt opposite to the extraction direction, i.e., with increasing distance from the load-bearing device.

The expansion part may have expansion slots, which extend from the front face of the expansion part. These expansion slots may simplify the radial expansion of the expansion part through the expansion region.

The expansion anchor may preferably be a force-controlled expanding expansion anchor, particularly a so-called anchor bolt. In regard to an anchor bolt, the expansion region may be arranged in an axially fixed manner to the bolt. In this case, when setting the expansion anchor, the expansion region is pressed to the expansion part by a joint axial motion of the bolt and the expansion region relative to the expansion part. The expansion region is thereby preferably designed integrally with the bolt. Alternatively, for a so-called sleeve anchor, the expansion region may be arranged on a part separate from the bolt, the part being preferably connected to the bolt by means of corresponding threads. The pressing of the expansion region against the expansion part can then preferably be effected at least partially by rotating the bolt relative to the expansion region, which is converted by a spindle drive, which is formed by the corresponding threads, into an axial motion of the expansion region relative to the bolt.

It is particularly preferred that an elastic element of the snap connection is formed by the expansion part. Accordingly, the expansion part is slightly bent open when joining the expansion part and sleeve and then at least partially relieved again. In a particularly simple manner and without impairing the efficiency of the anchor, one can obtain a particularly reliable snap connection.

Another preferred design consists of having the first rib and the second rib arranged on the expansion part and the first groove and the second groove being arranged on the bolt. Accordingly, the catches of the snap connection are formed by two ribs arranged on the expansion part and two grooves arranged on the bolt, which may be advantageous in regard to the efficiency of the anchor, the manufacturing costs, and the reliability of the snap connection.

According to the invention, an additional groove-rib combination may be provided between the expansion part and the bolt, which can also contribute in a form-locking manner to the snap connection, but are not required to do so. In particular, it may be provided for practical purposes that on the expansion part between, particularly in the circumferential direction between, the first rib and the second rib, there is arranged a third rib, and that on the bolt between, particularly in the circumferential direction between, the first groove and the second groove, there is arranged a third groove, into which the third rib engages. This may be advantageous among other things in regard to the effectiveness of the anchor. The third groove and the third rib may contribute in a form-locking manner to the snap connection, but are not required to do so.

It is particularly advantageous that the expansion part is a sleeve segment, which allows for a particularly reliable snap connection and a particularly symmetrical force transfer. Preferably the expansion part encompasses an angle of more than 90 degrees, particularly approximately 180 degrees, measured at the longitudinal axis of the bolt. In particular, the angle distance measured at the longitudinal axis of the bolt between the first groove and the second groove can be larger than 45 degrees, particularly larger than 60 degrees. In a particularly simple manner, one can hereby design a particularly robust snap connection. The expansion region is suitably arranged on an expansion cone.

Another advantageous design of the invention lies in the fact that the expansion anchor has at least an additional expansion part, which is attached to the bolt by means of a snap connection. The snap connection of the first expansion part and the snap connection of the additional expansion part are preferably designed in an analogous and symmetrical manner. In particular, the expansion parts together may form an expansion sleeve and/or complement each other into an expansion sleeve, in other words preferably at least almost fully enclose the bolt. Preferably the expansion parts can thus be arranged at least regionally on the same axial height longitudinally along the bolt and/or the expansion region can be provided for the radial displacement also of the at least one additional expansion part relative to the bolt. It is particularly preferred that a total of two or three, but also four, expansion parts are provided, which together form the expansion sleeve. For a higher number of expansion parts that together form the expansion sleeve, the effectiveness of the snap connection can decrease under certain conditions due to the comparatively low angular expansion of the individual expansion parts around the bolt.

The invention also relates to a method for manufacturing an expansion anchor according to the invention, in which the bolt and the expansion part are provided as separate components, and the expansion part is subsequently pressed radially to the bolt and the expansion part is thereby connected, in particular engaged to the bolt. Accordingly, the snap connection is actuated as intended during manufacturing.

The invention is explained in further detail below by means of preferred embodiments, which are illustrated schematically in the attached drawings, wherein individual features of the embodiments shown below may be designed within the scope of the invention basically singly or in any combination.

DETAILED DESCRIPTION OF THE DRAWINGS

Figure 1:
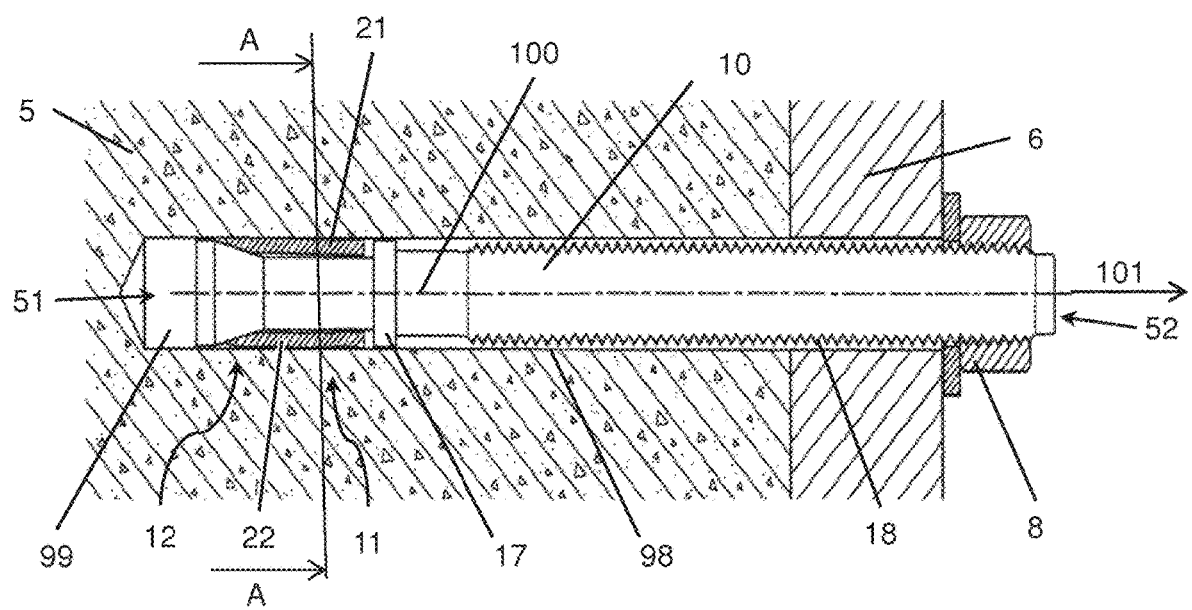
FIG. 1: a longitudinal sectional view of an expansion anchor according to the invention set in a concrete substrate.

The drawings show an embodiment of an expansion anchor according to the invention. The expansion anchor has a bolt 10 and two expansion parts 21 and 22, wherein the expansion parts 21 and 22 are each designed in a sleeve segment-type manner and together form an expansion sleeve, which encloses bolt 10 in a ring-shaped manner. Bolt 10 has a neck region 11 having an essentially constant cross-section and in the adjoining neck region 11 in the region of the front end 51 of bolt 10, it has an expansion region 12 for expansion parts 21 and 22, in which bolt 10 expands starting from neck region 11 to its front end 51. On the side, facing away from expansion region 12, of neck region 11, bolt 10 has a stop 17 designed for example as an annular shoulder for expansion parts 21 and 22. In the region of its rearward end 52 opposite expansion region 12, bolt 10 is equipped with a load-bearing device 18 designed as an exterior thread.

When seating the expansion anchor, bolt 10 is pushed with its front end 51 and expansion region 12 forward in the direction of longitudinal axis 100 of bolt 10 into a borehole 99 in substrate 5 from FIG. 1. Because of stop 17, expansion parts 21 and 22 are thereby also introduced into the hole. Then, bolt 10 is pulled out a little bit again from borehole 99 in extraction direction 101 by tightening a nut 8 arranged on load-bearing device 18 designed as an exterior thread. Due to its friction with wall 98 of borehole 99, expansion parts 21 and 22 thereby remain behind and instead there is a displacement of bolt 10 relative to expansion parts 21 and 22, within the scope of which expansion region 12 of bolt 10 acts radially against expansion parts 21 and 22 and presses these against wall 98 of borehole 99. By means of this mechanism, the expansion anchor is secured in substrate 5. The set state of the expansion anchor, in which it is secured in substrate 5, is shown in FIG. 1. By means of nut 8, one can affix an add-on element 6 on substrate 5.

Particularly as shown in FIGS. 2, 3, 5 and 6, bolt 10 has in its neck region 11 a plurality of grooves 61; in the depicted embodiment, there are six grooves 61. These grooves 61 extend parallel to each other and parallel to longitudinal axis 100 of bolt 10, preferably starting at stop 17 and going into expansion region 12. In the cross-section of FIGS. 5 and 6, bolt 10 has in neck region 11 a non-circular shape, preferably a wave-like shape, wherein the wave troughs are formed by grooves 61. In a cross-section, the flanks of grooves 61 each preferably form a shoulder.

Figure 2:
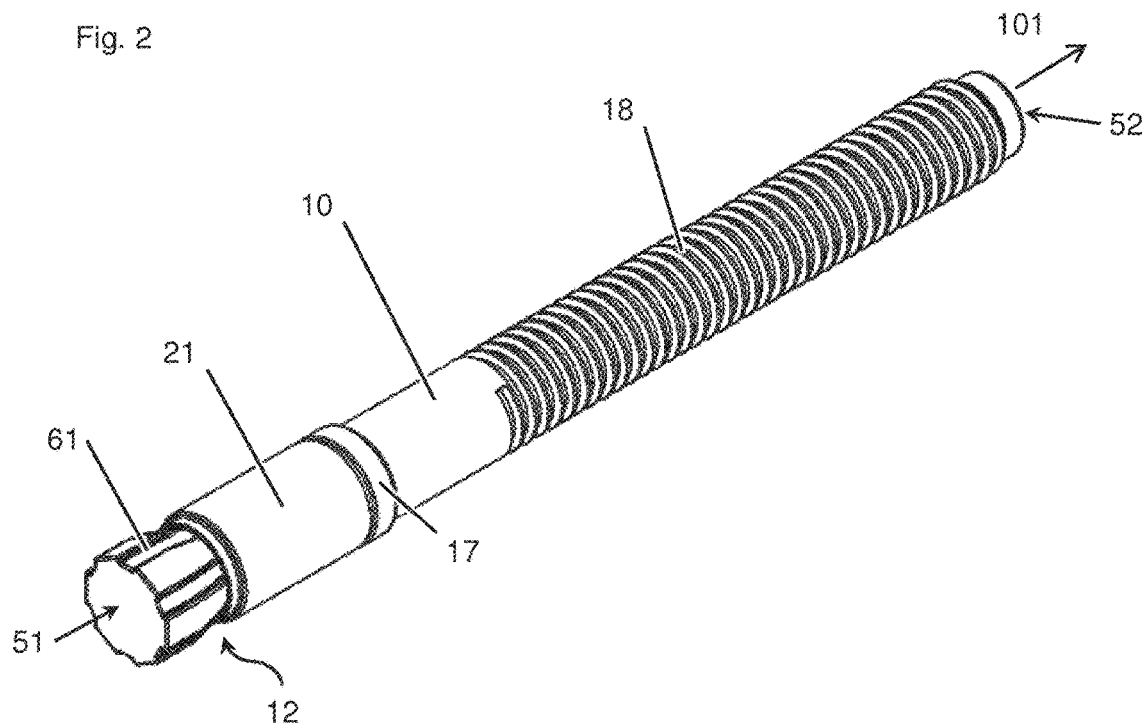
FIG. 2: a perspective view of the expansion anchor from FIG. 1.
Figure 3:
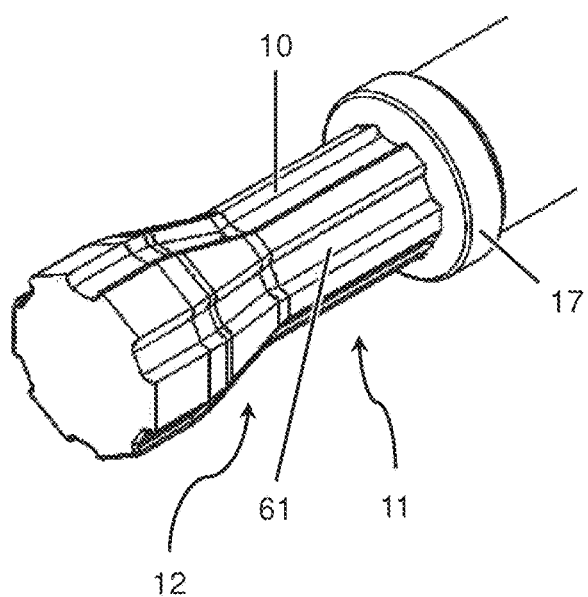
FIG. 3: a perspective view of the bolt of the anchor from FIG. 1 in the region of the front end of the bolt.

In expansion region 12 of bolt 10, the circumference of bolt 10 increases about longitudinal axis 100 as the distance increases from neck region 11 (see FIGS. 1 to 3). As shown in the drawings, grooves 61 may extend from neck region 11 of bolt 10 into expansion region 12 of bolt 10. In this case, in its cross-section expansion region 12 of bolt 10 also has a non-circular shape, preferably a wave-like shape.

Figure 4:
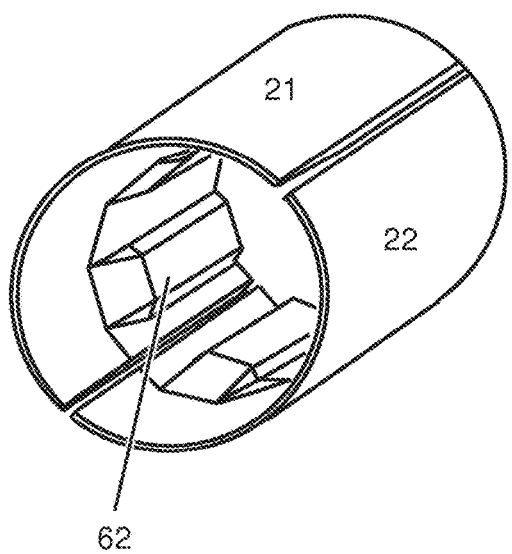
FIG. 4: a perspective view of the expansion parts of the anchor from FIG. 1.
Figure 5:
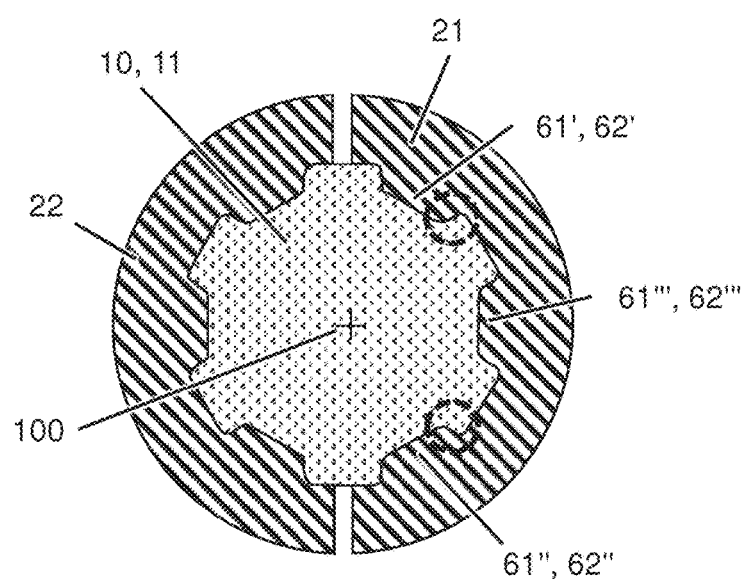
FIG. 5: a cross-sectional view rotated 90 degrees through the anchor from FIG. 1 in the region of the expansion parts, particularly according to aspect A-A in FIG. 1.
Figure 6:
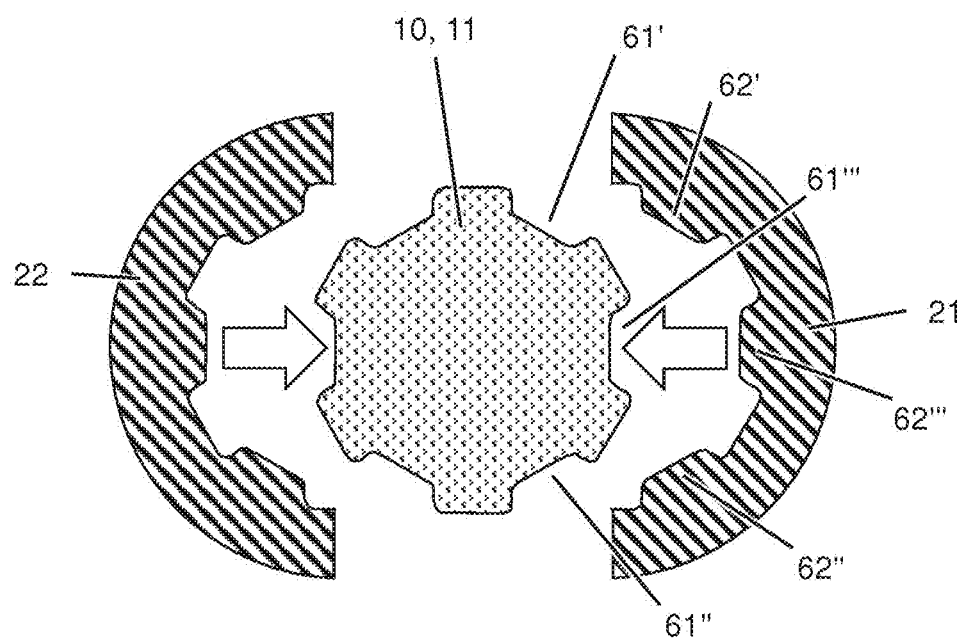
FIG. 6: a view according to FIG. 5 when assembling the anchor.

As particularly shown in FIGS. 4, 5 and 6, expansion parts 21 and 22 have on their interior side a plurality of ribs 62; in the depicted embodiment, there are six ribs 62. The number of ribs 62 on the interior side of expansion parts 21 and 22 preferably corresponds to the number of grooves 61 in neck region 11 of bolt 10 or is less than the number of grooves 61. Ribs 62 extend parallel to each other and parallel to longitudinal axis 100 of the bolt. Cross-sectionally (FIGS. 5 and 6), expansion parts 21 and 22 preferably have an interior wave-like shape, wherein the wave peaks are formed by ribs 62. Cross-sectionally, the flanks of ribs 62 preferably each form a shoulder. On ribs 62, expansion parts 21 and 22 have a thicker wall thickness than in the circumferential direction offset to ribs 62, as one can see for example in FIGS. 5 and 6. As the cross-sectional view of FIG. 5 shows in particular, ribs 62 of expansion parts 21 and 22 engage in grooves 61 in neck region 11 of bolt 10.

The manufacturing method of the previously described expansion anchor is sketched in FIG. 6. As FIG. 6 shows, in the manufacturing process, first bolts 10 and the two expansion parts 21 and 22 are provided as three separate parts. Then, the two expansion parts 21 and 22 are radially brought to bolt 10. In doing so, a first rib 62' arranged on expansion part 21 engages in a first groove 61' arranged on bolt 10, and a second rib 62" arranged on expansion part 21 engages in a second groove 61" arranged on bolt 10. Upon entry, expansion part 21 bends open slightly and then is relieved again at least partially, wherein in the relieving stage, form-locking connections are created between first groove 61' and first rib 62' and between second groove 61" and second rib 62", namely at the flanks circled with dashed lines in FIG. 5. This form-locking connection henceforth secures expansion part 21 against a lifting in the radial direction of bolt 10, i.e., expansion part 21 is attached to bolt 10 by means of a snap connection.

In the circumferential direction between first groove 61' and second groove 61", bolt 10 has a third groove 61''', into which engages a third rib 62''' arranged on expansion part 21. This third groove-rib combination can be provided particularly in regard to the efficiency of the anchor. It may also contribute to the radial form-locking connection, but is not required to do so.

Second expansion part 22 is attached to bolt 10 by means of a snap connection, which is designed similar to and symmetrically to the snap connection of first expansion part 21, and which is based in particular also on form-locking connections, which are formed between at least two grooves and at least two ribs.

The invention claimed is:

1. An expansion anchor, comprising:
a bolt as a first element; and
an expansion part as a second element, wherein the expansion part is disposed on the bolt;
wherein an expansion region and a load-bearing device are disposed on the bolt, wherein the expansion part is radially displaceable relative to the bolt by the expansion region and wherein tensile forces are transferable into the bolt by the load-bearing device;
wherein one of the first and the second elements has a first rib running longitudinally along the bolt and the other of the first and the second elements has a first groove running longitudinally along the bolt, wherein the first rib engages in the first groove;
wherein the one of the first and the second elements has a second rib running longitudinally along the bolt and the other of the first and the second elements has a second groove running longitudinally along the bolt, wherein the second rib engages in the second groove;
wherein the expansion part is attached to the bolt by a snap connection;
wherein a first catch of the snap connection is formed between the first rib and the first groove;
wherein a second catch of the snap connection is formed between the second rib and the second groove;
and wherein the first catch and the second catch hold the expansion part radially to the bolt.

2. The expansion anchor according to claim 1, wherein an elastic element of the snap connection is formed by the expansion part.

3. The expansion anchor according to claim 1, wherein the first rib and the second rib are disposed on the expansion part and wherein the first groove and the second groove are disposed on the bolt.

4. The expansion anchor according to claim 3, wherein a third rib is disposed on the expansion part between the first rib and the second rib, wherein a third groove is disposed on the bolt between the first groove and the second groove, and wherein the third rib engages in the third groove.

5. The expansion anchor according to claim 1, wherein the expansion part is a sleeve segment and/or wherein the expansion region is disposed on an expansion cone.

6. The expansion anchor according to claim 1 further comprising an additional expansion part, wherein the additional expansion part is attached to the bolt by an additional snap connection.

7. A method for manufacturing the expansion anchor according to claim 1, comprising the steps of:
providing the bolt and the expansion part as separate elements; and
subsequently to the providing, radially pressing the expansion part on to the bolt and thereby connecting the expansion part to the bolt by the snap connection.

* * * * *